US006691188B2

(12) United States Patent
Bae

(10) Patent No.: US 6,691,188 B2
(45) Date of Patent: Feb. 10, 2004

(54) METHOD OF MATCHING CABLES AND MONITOR FOR PERFORMING THE METHOD

(75) Inventor: Jong-Hwa Bae, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 302 days.

(21) Appl. No.: 09/917,623

(22) Filed: Jul. 31, 2001

(65) Prior Publication Data

US 2002/0095534 A1 Jul. 18, 2002

(30) Foreign Application Priority Data

Jan. 17, 2001 (KR) .......................................... 2001/2633

(51) Int. Cl.$^7$ ................................................ G06F 13/00
(52) U.S. Cl. ............................................ 710/62; 710/72
(58) Field of Search ................................ 710/62, 72, 8, 710/15

(56) References Cited

U.S. PATENT DOCUMENTS 5,197,055 A 3/1993 Hartung et al.

(List continued on next page.)

FOREIGN PATENT DOCUMENTS

WO WO 00/68813 * 11/2000 ........... G06F/15/16

OTHER PUBLICATIONS

U.S. patent application Ser. No. 09/932,332, Filed on Aug. 17, 2001, entitled, "Method, System, and Program for Handling Errors Occurring in Function Calls", invented by K.S. Goldsmith and R.G. Vining.

(List continued on next page.)

*Primary Examiner*—Jeffrey Gaffin
*Assistant Examiner*—Alan S Chen
(74) *Attorney, Agent, or Firm*—Robert E. Bushnell, Esq.

(57) ABSTRACT

In a cable matching method and a monitor for performing the method, one of several video connection ports and one of several communication connection ports are selected. It is then determined whether the video cable connected to the selected video connection port matches the serial communication cable connected to the selected communication connection port. The other of the communication connection ports is selected if it is determined that the video cable connected to the selected video connection port does not match the serial communication cable connected to the selected communication connection port. Matching information representing the matching relationship between the video cables and the serial communication cables is obtained after the other communication connection port is selected, or if it is determined that the video cable connected to the selected video connection port does match the serial communication cable connected to the selected communication connection port. The term "matching" denotes the connection of the video cable and the serial communication cable to the same video input source. The monitor displays a picture corresponding to a video signal received via the selected video connection port, and a communication connection port, to which the serial communication cable that matches the video cable connected to the selected video connection port is connected, is connected to a manipulator operable by a user. In this way, an environment for easy and effective use of two video input sources can be easily established.

17 Claims, 5 Drawing Sheets

U.S. PATENT DOCUMENTS

| | | | | |
|---|---|---|---|---|
| 5,513,156 | A | | 4/1996 | Hanaoka et al. |
| 5,933,395 | A | | 8/1999 | Dang et al. |
| 5,943,304 | A | | 8/1999 | Kamada et al. |
| 5,956,301 | A | | 9/1999 | Dimitri et al. |
| 5,991,245 | A | | 11/1999 | Yoshimura |
| 6,023,643 | A | | 2/2000 | Jesionowski |
| 6,128,178 | A | * | 10/2000 | Newns |

OTHER PUBLICATIONS

U.S. patent application Ser. No. 09/573,530, Filed on May 19, 2000, entitled, "High Availability Work Queuing in an Automated Data Storage Library", invented by B.G. Goodman and L.G. Jesionowski, including Amendments to Claims dated Aug. 7, 2001.

U.S. patent application Ser. No. 09/573,531, Filed on May 19, 2000, entitled, "Automated Data Storage Library Distributed Control System", invented by Goodman; L.G. Jesionowski; M.P. McIntosh; F. Quintana; C.A. Thompson, Jr.; and R. Yardy, including Amendments to Claims dated Aug. 16, 2001.

* cited by examiner

METHOD OF MATCHING CABLES AND MONITOR FOR PERFORMING THE METHOD

CLAIM OF PRIORITY

This application makes reference to, incorporates the same herein, and claims all benefits accruing under 35 U.S.C. §119 from my application METHOD FOR MATCHING CABLES AND MONITOR FOR PERFORMING THE METHOD filed with the Korean Industrial Property Office on Jan. 17, 2001 and there duly assigned Ser. No. 2633/2001.

BACKGROUND OF THE INVENTION

1. Technical Field

The present invention relates to a system in which two video input sources, such as personal computers (PCs), share a monitor and, more particularly, to a method of matching cables connected between a monitor and video input sources in the monitor, and a monitor for performing the matching method.

2. Related Art

A conventional system is made up of first and second PCs, first and second video cables, first and second Universal Serial Bus (USB) cables, and a monitor having first and second video ports and first and second USB ports.

In order for the first and second PCs to share the monitor, the first and second video cables and the first and second bidirectional USB cables are connected between the first PC and the monitor, and between the second PC and the monitor. The video cable transmits a video signal output from the first or second PC to the monitor, and the USB cable transmits a communication signal between the first or second PC and the monitor. The monitor can receive a video signal from only one of the two PCs at a certain point in time. In that case, the monitor must transmit a communication signal to, and receive it from, the PC from which the monitor has received the video signal. Accordingly, the PC which transmits and receives a communication signal must be the same as the PC which currently receives the video signal. However, the conventional monitor cannot know which of the first and second USB ports the USB cable (of the PC which is connected to the video cable connected to the video port through which the video signal is currently received) is connected to. In order to solve this problem, the conventional monitor recognizes that a video cable and a USB cable connected to the first video port and the first USB port, respectively, are connected to the same PC, and that a video cable and a USB cable connected to the second video port and the second USB port, respectively, are connected to the same PC. For example, the conventional monitor is given the fixed matching relationship between ports in advance, and then recognizes and processes signals which are input to these ports.

Hence, in order to smoothly perform a corresponding operation using the first and second PCs and the single monitor, a user must connect video and USB cables to corresponding ports while considering which of the video ports matches which of the USB ports. Also, if a user connects the video and USB cables to the wrong video and USB ports without knowing the matching relationship between ports, or with carelessness even though he or she knows the matching relationship, he or she should ascertain the unmatched connection through a scene displayed on the monitor, and then physically re-connect the wrongly-connected cables to the correct ports.

SUMMARY OF THE INVENTION

To solve the above problem, an objective of the present invention is to provide a method of matching cables in a monitor capable of matching video and serial communication cables connected to the same video input source regardless of the state in which the video and serial communication cables are connected to the video and communication connection ports of the monitor.

Another objective of the present invention is to provide a monitor for performing the cable matching method.

To achieve the first objective, the present invention provides a cable matching method in a monitor which has two video connection ports that are connected to video cables for transmitting video signals output from two video input sources, and two communication connection ports that are connected to serial communication cables for transmitting communication signals that are exchanged with the video input sources. The monitor is connected to a manipulator that is manipulated by a user. The method includes: (a) selecting one of the video connection ports and one of the communication connection ports; (b) determining whether the video cable connected to the selected video connection port is matched with the serial communication cable connected to the selected communication connection port; (c) selecting the other of the communication connection ports if it is determined that the video cable connected to the selected video connection port does not match the serial communication cable connected to the selected communication connection port; and (d) obtaining matching information representing the matching relationship between the video cables and the serial communication cables after step (c), or if it is determined that the video cable connected to the selected video connection port is matched with the serial communication cable connected to the selected communication connection port. In this method, the term "matching" denotes the connection of the video cable and the serial communication cable to the same video input source, wherein the monitor displays a picture corresponding to a video signal received via the selected video connection port, and a communication connection port, to which the serial communication cable that matches the video cable connected to the selected video connection port is connected, is connected to the manipulator.

To achieve the second objective, the present invention provides a monitor for performing a cable matching method, including: a video connection unit for selecting one of the video signals in response to a first selection signal, and outputting the selected video signal; a communication connection unit for selecting one of the communication connection ports in response to a second selection signal, and connecting the selected communication connection port to the manipulator in response to a first control signal; a control unit for outputting the first selection signal and the first control signal, outputting the second selection signal in response to an external non-matching signal, and producing the matching information; and a display unit for processing the video signal output from the video connection unit, and displaying a picture. Preferably, the non-matching signal is generated by the manipulator according to matching or non-matching.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DESCRIPTION OF THE PREFERRED EMBODIMENTS

Figure 1:
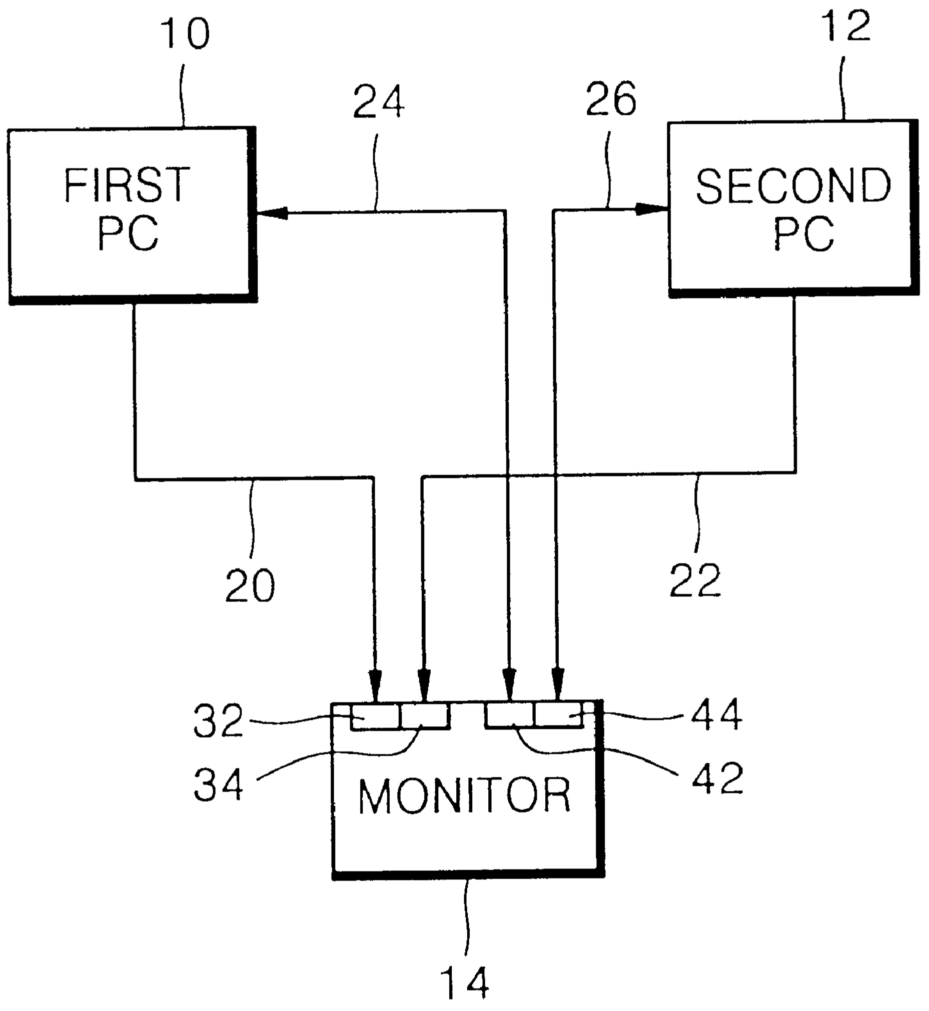
FIG. 1 is a block diagram schematically illustrating a system in which two personal computers share a monitor.

FIG. 1 is a block diagram schematically illustrating a system in which two PCs share a monitor. This system is made up of first and second PCs 10 and 12, first and second video cables 20 and 22, first and second bidirectional Universal Serial Bus (USB) cables 24 and 26, and a monitor 14 having first and second video ports 32 and 34 and first and second USB ports 42 and 44.

As shown in FIG. 1, in order for the first and second PCs 10 and 12 to share the monitor 14, the first and second video cables 20 and 22 and the first and second bidirectional USB cables 24 and 26 are connected between the first PC 10 and the monitor 14 and between the second PC 12 and the monitor 14, respectively. The video cable 20 or 22 transmits a video signal output from the first or second PC 10 or 12 to the monitor 14, and the USB cable 24 or 26 transmits a communication signal between the first or second PC 10 or 12 and the monitor 14. The monitor 14 can receive a video signal from only one of the two PCs 10 and 12 at a given time. In this case, the monitor 14 must transmit a communication signal to, and receive it from, the PC from which the monitor 14 has received the video signal. Accordingly, the PC which transmits and receives a communication signal must be the same as the PC which currently receives the video signal. However, the monitor 14 cannot know which of the first and second USB ports 42 and 44 the USB cable 24 or 26 of the PC 10 or 12 (which is connected to the video cable 20 or 22 connected to the video port 32 or 34 through which the video signal is currently received) is connected to. In order to solve this problem, the monitor 14 recognizes that a video cable and a USB cable connected to the first video port 32 and the first USB port 42, respectively, are connected to the same PC, and that a video cable and a USB cable connected to the second video port 34 and the second USB port 44, respectively, are connected to the same PC. For example, the monitor 14 is given the fixed matching relationship between ports in advance, and then recognizes and processes signals which are input to these ports.

Hence, in order to smoothly perform a corresponding operation using the first and second PCs 10 and 12 and the single monitor 14, a user must connect video and USB cables to corresponding ports while considering which of the video ports 32 and 34 matches which of the USB ports 42 and 44. Also, if a user connects the video and USB cables to the wrong video and USB ports without knowing the matching relationship between ports, or with carelessness even though he or she knows the matching relationship, he or she should ascertain the unmatched connection through a scene displayed on the monitor 14, and then physically re-connect the wrongly-connected cables to the correct ports.

Figure 2:
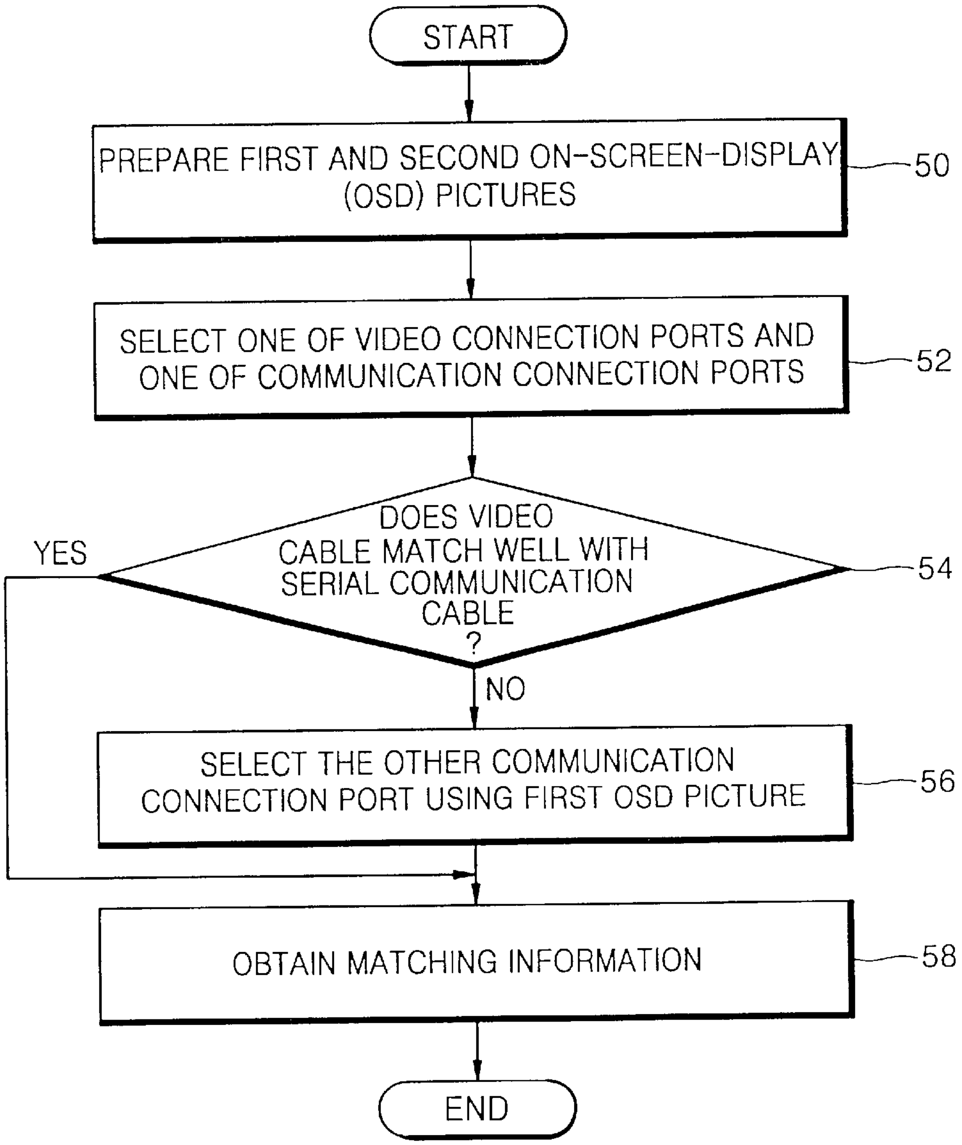
FIG. 2 is a flowchart illustrating a cable matching method in a monitor according to an embodiment of the present invention.
Figure 3:
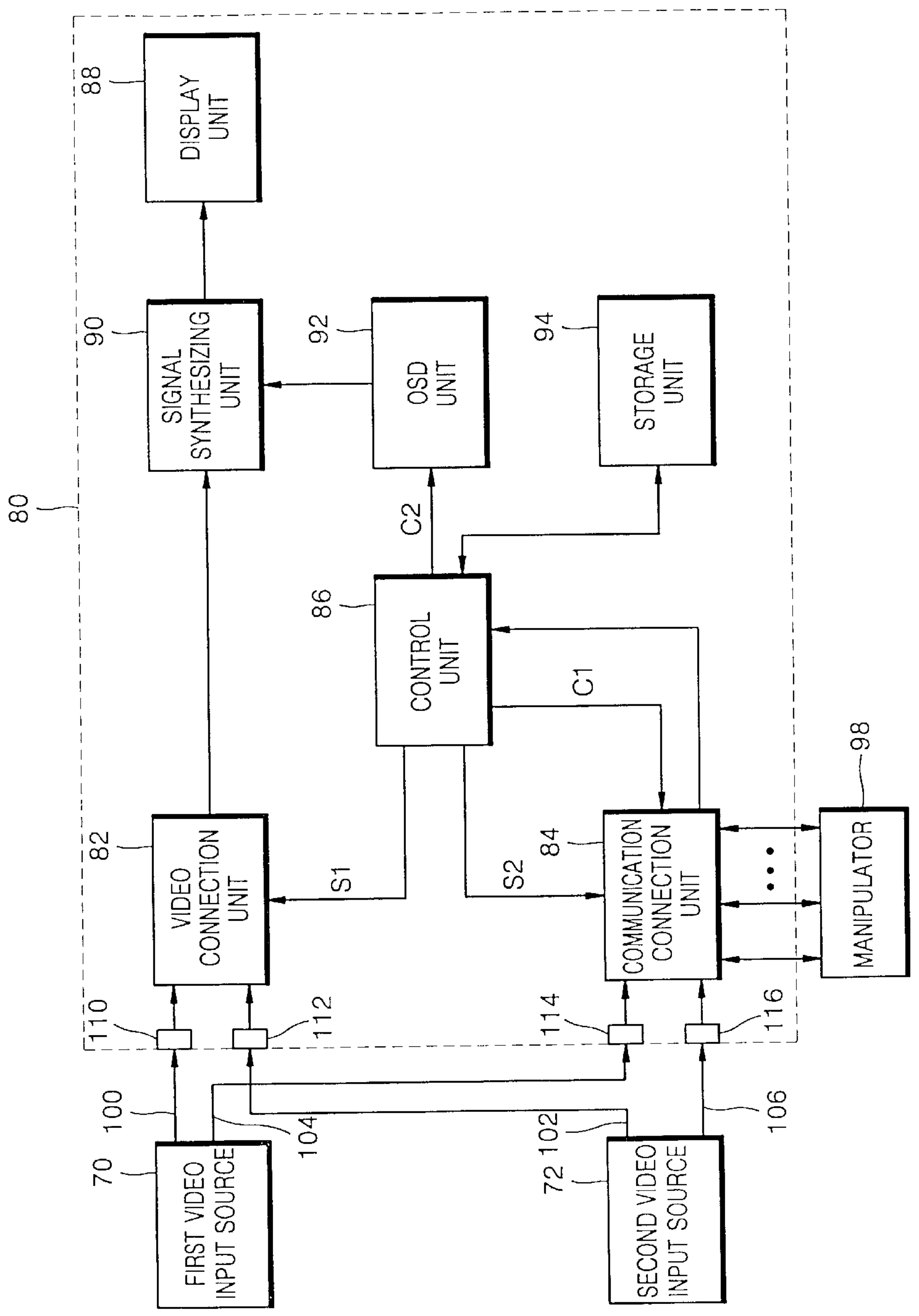
FIG. 3 is a block diagram of a monitor, according to the present invention, for performing the cable matching method shown in FIG. 2.

FIG. 2 is a flowchart illustrating a cable matching method in a monitor according to an embodiment of the present invention, while FIG. 3 is a block diagram of a monitor, according to the present invention, for performing the cable matching method shown in FIG. 2.

Referring to FIG. 2, a cable matching method in a monitor according to an embodiment of the present invention is made up of steps 50 thru 58 for matching video cables with serial communication cables.

Referring to FIG. 3, a monitor 80 for performing the cable matching method shown in FIG. 2 includes a video connection unit 82, a communication connection unit 84, a control unit 86 and a display unit 88. The monitor 80 can further include a signal synthesizing unit 90, an on-screen-display (OSD) unit 92, and storage unit 94.

The monitor 80 for performing the cable matching method is connected to first and second video input sources 70 and 72 via first and second video cables 100 and 102. For example, the video input sources 70 and 72 are personal computers. The first and second video cables 100 and 102 transmit video signals from the first and second video input sources 70 and 72 to the monitor 80, and are therefore electrically connected to first and second video connection ports 110 and 112. For example, the first and second video cables 100 and 102 can be a D-SUB cable and a BNC cable, respectively. Also, first and second serial communication cables 104 and 106 are connected between the first video input source 70 and the monitor 80 and between the second video input source 72 and the monitor 80, respectively. The monitor 80 transmits communication signals to, and receives them from, the first and second video input sources 70 and 72 via the first and second serial communication cables 104 and 106. Thus, first and second serial communication cables 104 and 106 are electrically connected to first and second communication connection ports 114 and 116, respectively, and can be Universal Serial Bus (USB) cables.

In contrast to the arrangement shown in FIG. 3, the first video cable 100 can be connected to the second video connection port 112, the second video cable 102 can be connected to the first video connection port 110, the first serial communication cable 104 can be connected to the second communication connection port 116, and the second serial communication cable 106 can be connected to the first communication connection port 114.

The monitor 80 is connected to an external manipulator 98 that is manipulated by users. That is, the manipulator 98 is connected to the video input source 70 or 72 via the communication connection port 114 or 116 as selected by the communication connection unit 84. For example, the manipulator 98 is connected to the second video input source 72 via the communication connection port 116 when the communication connection unit 84 selects the communication connection 116. The manipulator 98 can be the peripheral of a personal computer, such as a mouse or a keyboard.

In order to perform a cable matching method according to the present invention, the OSD unit 92 prepares a first OSD picture having first menus corresponding to the first and second communication connection ports 114 and 116, and a second OSD picture having second menus corresponding to the first and second video connection ports 110 and 112, in step 50.

Next, one of the first and second video connection ports 110 and 112, and one of the first and second communication connection ports 114 and 116, are selected, in step 52. In order to do this, the video connection unit 82 selects one of the first and second video connection ports 110 and 112 for receiving video signals output from the first and second video input sources 70 and 72, respectively, in response to a first selection signal S1 output from the control unit 86, and outputs a video signal received via the selected video connection port 110 or 112. Also, the communication connection unit 84 selects one of the first and second communication connection ports 114 and 116 in response to a second selection signal S2, and connects the selected communication connection port 114 or 116 to a corresponding peripheral of the manipulator 98 in response to a first control signal C1 output from the controller 86. For example, the communication connection unit 84 is a USB hub.

After the step 52, it is determined whether the video cable 100 or 102 connected to the selected video connection port 110 or 112, and the serial communication cable 104 or 106 connected to the selected communication connection port 114 or 116, are connected to the same video input source 70 or 72, in step 54. That is, it is determined whether the video cable matches well with the serial communication cable. In order to perform the step 54, users can determine matching or non-matching between the serial communication cable 104 or 106 and the video cable 100 or 102 by observing, for example, the motion of a mouse pointer on a picture displayed by a video signal, and a communication signal respectively received via the video cable and the serial communication cable connected to a selected video connection port and a selected communication connection port.

As shown in FIG. 3, if the cables 100, 102, 104 and 106 are connected to the connection ports 110, 112, 114 and 116, respectively, and if it is assumed that the first video connection port 110 and the first communication connection port 114 have been selected in step 52, a mouse pointer on a displayed picture properly moves since the first video cable 100 connected to the first video connection port 110, and the first serial communication cable 104 connected to the first communication connection port 114, have been connected to the same first video input source 70. Thus, a user determines that the first video cable 100 matches the first serial communication cable 104 by observing the motion of a mouse pointer on a displayed picture.

However, although the first and second video cables 100 and 102 are connected to the first and second video connection ports 110 and 112, respectively, assume that the first and second serial communication cables 104 and 106 are connected to the second and first communication connection ports 116 and 114, respectively, due to user's mistake and in contrast with FIG. 3. In this case, if the first video connection port 110 and the first communication connection port 114 have been selected in step 52, the first video cable 100 and the second serial communication cable 106 do not match each other, so that, for example, a mouse pointer on a displayed picture does not properly move. Thus, it is determined that the first video cable 100 and the second serial communication cable 106 do not match well as a result of improper motion of the mouse pointer on a displayed picture. In this case, in the prior art, a user must physically connect the first serial communication cable 104 to the first communication connection port 114, and must connect the second serial communication cable 106 to the second communication connection port 116.

However, in the cable matching method according to the present invention, when a video cable connected to a video connection port selected in step 52 does not match a serial communication cable connected to a communication connection port selected in step 52, the control unit 86 generates the second selection signal S2 so that the communication connection unit 84 selects the other of the communication connection ports, in step 56.

Figure 4A:
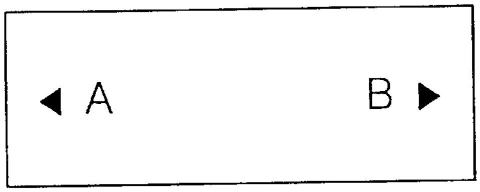
FIGS. 4A and 4B show examples of first and second on screen display (OSD) screens.
Figure 4B:
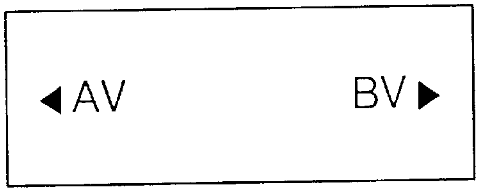

FIGS. 4A and 4B show an example of a first OSD picture and an example of a second OSD picture, respectively. In FIG. 4A, character A denotes a first menu for selecting the first communication connection port 114, and character B denotes a first menu for selecting the second communication connection port 116. In FIG. 4B, character AV denotes a second menu for selecting the first video connection port 110, and character BV denotes a second menu for selecting the second video connection port 112.

In step 56 of FIG. 2, a user can select the other communication connection port using the first OSD picture shown in FIG. 4A. In order to do this, the control unit 86 of FIG. 3 outputs the second control signal C2 to the OSD unit 92, and the OSD unit 92 outputs the first OSD signal to the signal synthesizing unit 90 in response to the second control signal C2. The signal synthesizing unit 90 synthesizes the first OSD signal output from the OSD unit 92 with a video signal output from the video connection unit 82, and outputs the synthesized result to the display unit 88. The display unit 88 processes the synthesized result output from the signal synthesizing unit 90, and displays to the user a scene containing the first OSD picture of FIG. 4A, which corresponds to the first OSD signal. That is, the display unit 88 amplifies the synthesized result, and displays the amplified result to the user. If the first serial communication cable 104, which should be connected to the first communication connection port 114, has been connected to the second communication connection port 116, the user selects the first menu B shown in FIG. 4A using, for example, the mouse of the manipulator 98. The mouse of the manipulator 98 outputs a non-matching signal, representing that the video cable and the serial communication cable does not match with each other, to the control unit 86 via the communication connection unit 84. The control unit 86 generates the second selection signal S2, which causes the communication connection unit 84 to select the second communication connection port 116, in response to the non-matching signal received from the communication connection unit 84. Thus, regardless of the way in which the serial communication cables 104 and 106 are connected to the communication connection ports 114 and 116, in the cable matching method according to the present invention, the matched first video cable 100 and the matched first serial communication cable 104 connected to the same video input source 70 can be connected to the monitor 80.

In step 54 of FIG. 2, in contrast to FIG. 3, matching or non-matching of the video cables and the serial communication cables can be determined by methods other than through an OSD picture. That is, the control unit 86 of FIG. 3 can perform step 54 by analyzing a video signal output from the video connection unit 82 and a communication signal received via a communication connection port selected by the communication connection unit 84. In this case, step 50 is omitted, and the OSD unit 92 and the signal synthesizing unit 90 need not be provided.

If it is determined in step 54 that the video cable matches the serial communication cable, or after completion of step 56, the control unit 86 generates matching information representing the matching relationship between the video cables and the serial communication cables, in step 58. That is, the control unit 86 produces, as matching information, the matching relationship determined by the above-described matching operations (steps 54 and 56). For example, when the cables are connected to the ports as shown in FIG. 3, the control unit 86 automatically produces, as matching information, the matching relationship in which the first video connection port 110 and the first communication connection port 114 match, and in which the second video connection port 112 and the second communication connection port 116 match.

In the case where the user wants to receive a video signal from the second video input source 72, and exchanges a communication signal with the source 72 while the monitor 80 receives a video signal from the first video input source 70 and exchanges a communication signal with the source 70, a cable matching method according to the present invention will now be described with reference to FIG. 5.

Figure 5:
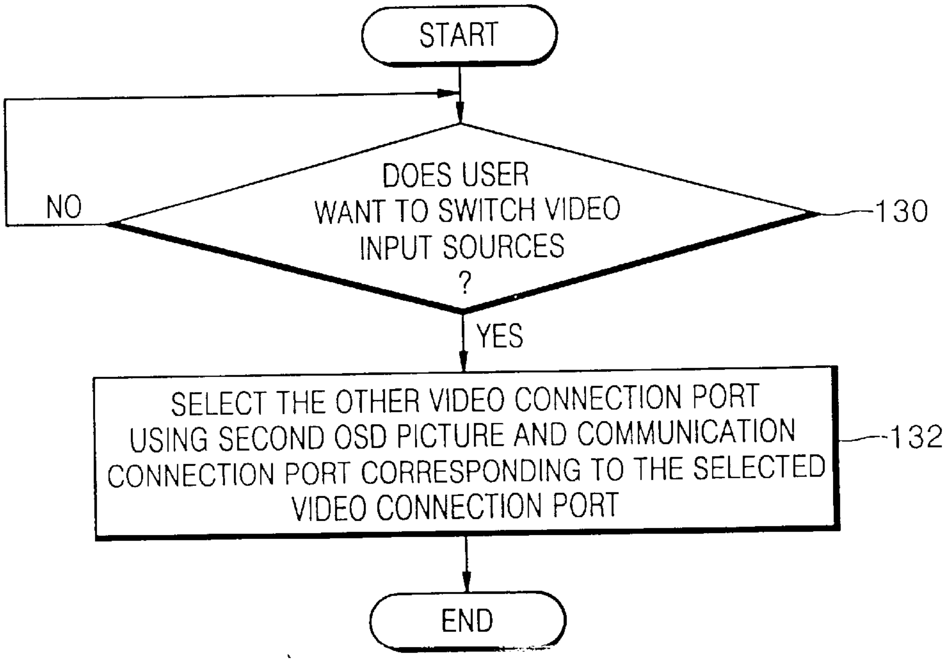
FIG. 5 is a flowchart illustrating a cable matching method according to another embodiment of the present invention in the case where a change in video input source is wanted.

FIG. 5 is a flowchart illustrating a cable matching method according to another embodiment of the present invention in the case where change of the video input source is desired. This method is made up of steps 130 and 132 of selecting a video connection port and a communication connection port using the second OSD picture.

After step 58 of producing matching information, the control unit 86 continuously determines whether a user wants to switch the video input sources 70 and 72, in step 130. In order to do this, the control unit 86 determines whether a source switch request signal for requesting a switch of the video input sources 70 and 72 is received from an external source via the communication connection unit 84. The source switch request signal is generated by the manipulator 98 when a user manipulates the manipulator 98 to switch the video input sources 70 and 72. The user clicks the second menu AV or BV, which corresponds to a desired video input source 70 or 72, on the second OSD picture of FIG. 4B using the pointer of a mouse so that the source switch request signal for requesting a switch of the video input sources 70 and 72 is generated.

If the source switch request signal generated at the user's request to switch the video input sources 70 and 72 is received, the control unit 86 outputs the first selection signal S1 to the video connection unit 82 to select the other video connection port 110 or 112, and selects a communication connection port corresponding to the selected video connection port using the matching information, in step 132. That is, the control unit 86 causes the other video connection port to be selected, and simultaneously determines a communication connection port to which a serial communication cable, matched with the video cable connected to the selected video connection port, is connected by analyzing the matching information, and outputs the second select signal S2 to the communication connection unit 84 so that the determined communication connection port is selected.

According to another embodiment of the present invention, the user can use the second OSD picture of FIG. 4B to select the other video connection port in step 132 of FIG. 5. In order to do this, the control unit 86 outputs the second control signal C2 to the OSD unit 92 in response to the source switch request signal received from the communication connection unit 84, and the OSD unit 92 outputs the second OSD signal to the signal synthesizing unit 90 in response to the second control signal C2. The signal synthesizing unit 90 synthesizes the second OSD signal output from the OSD unit 92 with a video signal output from the video connection unit 82, and outputs the result of the synthesization to the display unit 88. The display unit 88 processes the result of the synchronization output from the signal synthesizing unit 90, and displays to the user a scene having the second OSD picture of FIG. 4B corresponding to the second OSD signal. If the user wants to change the first video input source 70 to the second video input source 72, he or she selects the second menu BV on the second OSD picture of FIG. 4B using the manipulator 98, such as a mouse. At this time, the mouse of the manipulator 98 causes generation of a source switch request signal, representing a demand for a switch of video input sources, and this signal is provided to the control unit 86 via the communication connection unit 84. The control unit 86 generates the first selection signal S1 in response to the source switch request signal received from the communication connection unit 84 so that the video connection unit 82 selects the second video connection port 112, and control unit 86 outputs the second selection signal S2 to the communication connection unit 84 so that the second communication connection port 116 (to which the second serial communication cable 106, matched with the second video cable 102 connected to the second video connection port 112, is connected) is selected by analyzing the matching information.

In a state where a video signal and a communication signal are transmitted to the monitor 80 or received therefrom via the selected video connection port 110 or 112 and the selected communication connection port 114 or 116, when power supplied to the monitor 80 is turned off and then turned on, the control unit 86 reads the matching information which is stored in the storage unit 94 before power is turned off, and outputs the first and second selection signals S1 and S2 for selecting the video connection port and the communication connection port to which respective cables matched before power is turned off are connected to the video connection unit 82 and the communication connection unit 84, respectively, by analyzing the read matching information. In order to do this, an electrical erasable programmable read-only memory (EEPROM) can be used as the storage unit 94 to store the matching information received from the control unit 86.

When a serial communication cable(s) is (are) disconnected from the communication connection port(s), a user cannot know of this disconnection through the monitor 80. Thus, the cable matching method according to the present invention cannot perform a special procedure for the disconnection. However, when a video cable(s) is (are) disconnected from the video connection port(s), the cable matching method according to the present invention can perform the following operation.

Figure 6:
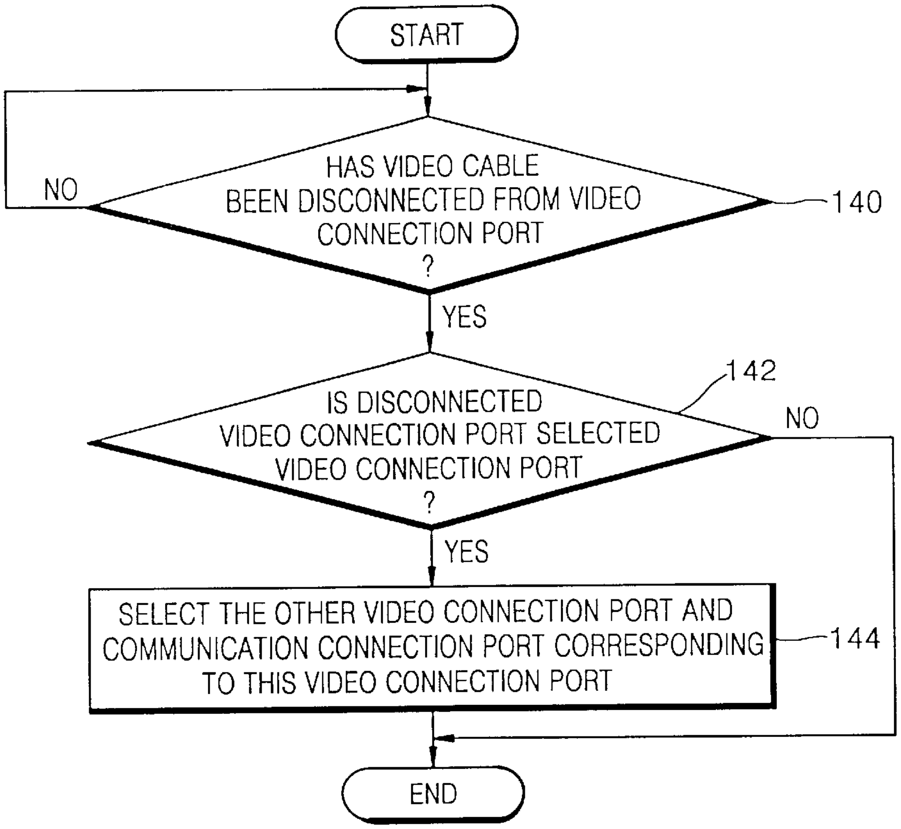
FIG. 6 is a flowchart illustrating a cable matching method according to still another embodiment of the present invention in the case where a video cable(s) is (are) disconnected from a video connection port(s)

FIG. 6 is a flowchart illustrating a cable matching method according to still another embodiment of the present invention in the case where video cable(s) is (are) disconnected from video connection port(s). This method includes steps 140 thru 144 of matching cables depending on which one of the video connection ports is disconnected.

First, after the matching information is obtained, the control unit 86 continuously determines whether the video cable(s) is (are) disconnected from the video connection port(s), in step 140. In order to do this, the video connection unit 82 can include a separate detector (not shown) for detecting disconnection between a video cable and a video connection port.

If it is determines that a video cable is disconnected from a video connection port, the control unit 86 determines whether the disconnected video connection port is a currently-selected video connection port 110 or 112, in step 142. That is, the control unit 86 determines whether a 18 picture has been displayed by a video signal received via the disconnected video connection port.

If it is determined that the disconnected video connection port is the currently-selected video connection port 110 or 112, the control unit 86 outputs the first selection signal S1 to the video connection unit 82 so that the other of the video connection ports is selected, in step 144. Simultaneously, the control unit 86 outputs the second selection signal S2 to the communication connection unit 84 so that a communication connection port connected to a serial communication cable matched with the video cable connected to the other video connection port (selected in response to the first selection signal S1) is selected using the matching information, in step 144. That is, when a video connection port which receives a currently-processed video signal is disconnected from its video cable, in the cable matching method according to the present invention, a video connection port and a corresponding communication connection port are automatically switched so that a video signal is automatically received from another video input source.

However, if it is determined (in step 142) that the disconnected video connection port is not the currently-selected video connection port 110 or 112, the method shown in FIG. 6 is concluded since the monitor 80 has no problem processing the current video signal. At that time, if the user wants to receive a video signal from a video input source connected to the video cable disconnected from the disconnected video connection port, the cable matching method according to the present invention is performed as described below.

Figure 7:
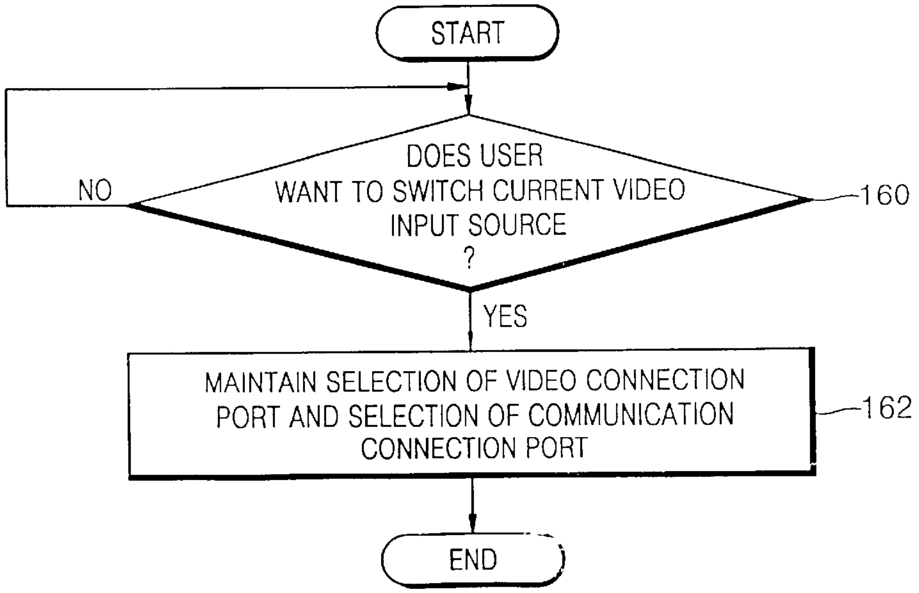
FIG. 7 is a flowchart illustrating a cable matching method according to yet another embodiment of the present invention in the case where a user wants to switch a current video input source to the disconnected video input source.

FIG. 7 is a flowchart illustrating a cable matching method according to yet another embodiment of the present invention in the case where a user wants to switch a current video input source to the disconnected video input source. In the case where the current video input source is to be switched to the disconnected video input source, the cable matching method includes the steps 160 and 162 for maintaining the connection between the still-connected video input source and the monitor 80.

If it is determined, in step 142, that the disconnected video connection port is not the current selected video connection port, the control unit 86 continuously determines whether a user wants to switch the current video input source to the other video input source, in step 160. In this case, the control unit 86 performs step 160, which is the same as step 130.

If it is determined that a user wants to switch the current video input source to the other video input source (that is, if it is determined that a user wants to switch the current video input source to the disconnected video input source) the control unit 86 maintains the selection of the current selected video connection port and the current selected communication connection port which are not to be switched, since a video connection port has been disconnected from the video cable connected to the video input source currently requested by the user, in step 162.

As described above, in the cable matching method according to the present invention and with respect to the monitor for performing this method, when serial communication cable(s) is (are) wrongly connected to communication connection port(s), the communication connection ports can be simply switched through an OSD picture. Thus, there is no need to physically reconnect the mis-connected cables to appropriate connection ports as in the prior art. Also, in the present invention, a video input source can be simply selected or switched board on an OSD picture, and a corresponding serial communication cable is automatically selected only with the selection of a video input source. Therefore, an environment for proper and easy use of two video input sources can be easily established.

Although the preferred embodiments of the present invention have been described, it will be understood by those skilled in the art that the present invention should not be limited to the described preferred embodiment. Rather, various changes and modifications can be made within the spirit and scope of the present invention, as defined by the following claims.

What is claimed is:

1. A cable matching method for use with a monitor which has two video connection ports that are connected to video cables for transmitting video signals output from two video input sources, and two communication connection ports that are connected to serial communication cables for transmitting communication signals that are exchanged with the video input sources, said monitor being connected to a manipulator that is manipulated by a user, said method comprising the steps of:

(a) selecting one of the video connection ports and one of the communication connection ports;

(b) determining whether the video cable connected to the selected video connection port matches the serial communication cable connected to the selected communication connection port;

(c) selecting the other of the communication connection ports if it is determined that the video cable connected to the selected video connection port does not match the serial communication cable connected to the selected communication connection port; and (d) obtaining matching information representing the matching relationship between the video cables and the serial communication cables after completion of step (c), or if it is determined that the video cable connected to the selected video connection port matches the serial communication cable connected to the selected communication connection port.

2. The cable matching method of claim 1, wherein the matching denotes the connection of the video cable and the serial communication cable to the same video input source; the monitor displays a picture corresponding to a video signal received via the selected video connection port; and a communication connection port, to which the serial communication cable that matches the video cable connected to the selected video connection port is connected, is connected to the manipulator.

3. The cable matching method of claim 1, further comprising step (e), prior to step (a), of preparing an on-screen-display (OSD) picture having menus corresponding to the communication connection ports, and step (c) comprises selecting the other of the communication connection ports using the OSD picture.

4. The cable matching method of claim 1, further comprising the steps of:

(f) determining whether a user wants to switch video input sources; and (g) selecting the other of the video connection ports, and selecting the communication connection port, to which the serial communication cable that matches the video cable connected to the other selected video connection port is connected, using the matching information if it is determined that the user wants to switch the video input sources.

5. The cable matching method of claim 4, wherein, in step (g), the other of the video connection ports is selected using an on-screen display (OSD) picture, and the OSD picture has menus corresponding to the video connection ports.

6. The cable matching method of claim 1, wherein, when power to the monitor is turned off and then turned on, at least one of the video connection ports is matched with at least one of the communication connection ports using previously matching information.

7. The cable matching method of claim 1, further comprising the steps of:

(e) determining whether a video cable is disconnected from a video connection port;

(f) determining whether the disconnected video connection port is a current selected video connection port when it is determined that the video cable is disconnected from the video connection port; and (g) selecting the other of the video connection ports, and selecting the communication connection port, to which the serial communication cable that matches the video cable connected to the other video connection port is connected, using matching information, if it is determined that the disconnected video connection port is the current selected video connection port.

8. The cable matching method of claim 7, wherein, in step (g), the other of the video connection ports is selected using an on-screen display (OSD) picture, and the OSD picture has menus corresponding to the video connection ports.

9. The cable matching method of claim 7, further comprising the steps of:

determining whether a user wants to switch the video input sources, if it is determined, in step (f), that the disconnected video connection port is not the current selected video connection port; and maintaining selection of the current video connection port and selection of the current communication connection port if it is determined that the user wants to switch the video input sources.

10. A monitor for performing a cable matching procedure, comprising:

a manipulator operable by a user;

a video connection unit for selecting one of a plurality of video signals in response to a first selection signal, and for outputting the selected video signal;

a communication connection unit for selecting one of a plurality of communication connection ports in response to a second selection signal, and for connecting the selected communication connection port to the manipulator in response to a first control signal;

a control unit for outputting the first selection signal and the first control signal, for outputting the second selection signal in response to a non-matching signal, and for producing matching information; and a display unit for processing the selected video signal output from the video connection unit, and for displaying a picture, wherein the non-matching signal is generated by the manipulator according to matching or non-matching of cables.

11. The monitor of claim 10, further comprising:

an OSD unit for outputting a first OSD signal, having first menus corresponding to the communication connection ports, in response to a second control signal from the control unit; and a signal synthesization unit for synthesizing the first OSD signal with the selected video signal output from the video connection unit, and for outputting a synthesization signal to the display unit;

wherein the display unit processes the synthesization signal from the signal synthesization unit, and displays a first OSD picture corresponding to the first OSD signal, and wherein the non-matching signal is generated by the manipulator when the user selects one of the first menus displayed.

12. The monitor of claim 11, wherein the control unit generates the first and second selection signals in response to an external source switch request signal, representing a demand for switching video input sources, by analyzing the matching information.

13. The monitor of claim 11, wherein the OSD unit outputs a second OSD signal, having second menus corresponding to the video connection ports, to the signal synthesization unit in response to the second control signal, the signal synthesization unit synthesizes the second OSD signal with the selected video signal output from the video connection unit, and outputs the synthesization signal to the display unit, and the display unit processes the synthesization signal and displays a picture containing a second OSD picture corresponding to the second OSD signal.

14. The monitor of claim 13, wherein the source switch request signal is generated by the manipulator when a user selects a menu of the displayed second menus.

15. The monitor of claim 10, further comprising a storage unit for storing the matching information under the control of the control unit; and wherein, when power to the monitor is turned off and then turned on, the control unit generates the first and second selection signals by reading the matching information from the storage unit, and analyzing the matching information read from the storage unit.

16. The monitor of claim 10, wherein the monitor has a plurality of communication ports connected to serial communication cables comprising universal serial bus (USB) cables.

17. The monitor of claim 10, wherein the monitor has a plurality of video connection ports connected to video cables comprising a D-SUB cable and a BNC cable.

* * * * *